Patented Mar. 30, 1948

2,438,781

UNITED STATES PATENT OFFICE 2,438,781

STABILIZED HYPOCHLORITE SOLUTIONS AND PROCESS THEREFOR

Jonas Kamlet, New York, N. Y., assignor to Boyle-Midway Inc., New York, N. Y., a corporation of Delaware No Drawing. Application September 7, 1944,
Serial No. 553,103

8 Claims. (Cl. 23—86)

This invention relates to the stabilization of hypochlorite solutions. More particularly, it relates to products suitable for use as stabilizing agents in solutions of alkali-metal hypochlorites. It has for its purpose to provide a means for rendering concentrated aqueous solutions of alkali-metal hypochlorites stable over comparatively long periods of time, as for instance, during shelf storage in warehouses and retail stores. It has for its further purpose to obviate the necessity of employing excessively high concentrations of free caustic alkalis to protect hypochlorite solutions from deterioration. It has for its further purpose to provide a means for preparing stable hypochlorite solutions considerably more concentrated than those commonly employed at present as household bleaches and disinfectants and devoid of excessive causticity which may weaken fabrics, whereby considerable economies may also be effected in manufacturing, packaging, storing and shipping.

The instability of aqueous solutions of alkali-metal hypochlorites is attributable to a series of closely interrelated reactions. Hypochlorous acid is a very weak acid, being displaceable from its salts even by the carbon dioxide (i. e., carbonic acid) of the atmosphere. In solutions of pH between 5.0 and 10.0, free hypochlorous acid exists in equilibrium with neutral hypochlorite (Elod and Vogel, Melliand's Textilber., 18, 64 (1937)). As soon as a trace of free hypochlorous acid appears, it readily undergoes a dismutation:

$$3HOCl \rightarrow HClO_3 + 2HCl$$

forming chloric acid and hydrochloric acid. These are strong acids which further diminish the pH, forming more free hypochlorous acid. This, in turn, dismutates to form more chloric and hydrochloric acids, et cetera. Thus, the appearance of even a trace of free hypochlorous acid sets in motion a chain of reactions which finally cause the entire hypochlorite solution to deteriorate to a mixture of chlorate and chloride, totally useless for bleaching or disinfecting purposes.

The effect of permitting a bottle of hypochlorite solution to remain exposed to the carbon dioxide of the air, is, therefore, to cause its rapid and almost complete attenuation. Within a relatively short period, it will lose its entire content of active (i. e., electropositive) chlorine. Heat, light and traces of heavy metals (such as cobalt and iron) will accelerate or catalyze this decomposition.

In order to avoid this decomposition, it has been the general practice heretofore to add caustic alkalis to alkali-metal hypochlorite solutions, or to allow free caustic alkali to remain in the solution at the conclusion of the process of preparing the hypochlorite (as e. g., by the chlorination of caustic soda solution). Thus, as much as 20 to 30 grams of free NaOH per liter of concentrated sodium hypochlorite solution is often employed. Such high concentrations of free caustic alkali are often injurious to textile fabrics, causing mercerization and tendering. Even upon dilution, such alkaline solutions may also be the cause or contributing factor in the causation of dermatitis and similar irritations.

Numerous other means have been proposed for the stabilization of alkaline hypochlorite solutions. Ewé (Journ. Amer. Pharm. Assn. 9, 46–7 (1920)) uses a dilute solution of calcium hydroxide. Mandelbaum (German Patent 330,192 of 1920) advises the use of a sodium silicate solution. However, by the procedure described in this patent, only dilute solutions of stable sodium hypochlorite are obtainable. Thus, 40 parts of 38° Bé. sodium silicate solution and 10 to 15 parts of soda ash are required for the stabilization of 2 parts of 35° Bé. sodium hypochlorite solution. According to Carter (Ind. Eng. Chem. 18, 249 (1926)) sodium silicates have no effect in conserving the active chlorine titer in the absence of bleachable material (i. e., during storage). In the presence of such material, the chlorine value is conserved. Thus, the addition of a sodium silicate solution to the diluted bleaching solution during its use may effect some economies in active chlorine utilization, but no improvement in the shelf stability of the original solution can be effected by the addition of a sodium silicate thereto. On the contrary, the presence of traces of iron salts in almost all samples of commercial sodium silicates may serve to catalyze the decomposition of the hypochlorite solution.

Gullen and Hubbard (Journ. Biol. Chem., 37, 511–5 (1919)) stabilize Dakin's solution (0.5% NaOCl) by the addition of 0.5% borax, 0.5% to 1.0% of sodium carbonate or 0.2% NaOH to bring the pH of the solution to between 9.5 and 10.0. Wright (U. S. Patent 1,588,288 of 1926) finds that 10% of NaCl and 0.03% NaOH will stabilize a solution of sodium hypochlorite containing about 1% of active chlorine. According to Pritchard and Hubel (Canadian Patent 267,685 of 1927) alcohol or acetone may be used for the same purpose.

None of the aforementioned stabilizing agents are entirely satisfactory. In all cases, a diminution of the pH (as e. g., by the accidental exposure of an unstoppered bottle to the carbon dioxide of the air) will cause free hypochlorous acid to appear below pH 10.0 and the entire solution will rapidly deteriorate.

I have now found that alkali-metal hypochlorite solutions can be stabilized by the addition thereto of minor amounts of a member of the group of compounds of the general formula:

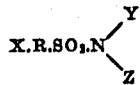

where R is an aryl group (such as phenyl, tolyl, xylyl, naphthyl, etc.), X is a member of the group consisting of hydrogen and —COOY, Y is a member of the group consisting of hydrogen and alkali-metal, and Z is a member of the group consisting of hydrogen, alkali-metal and chlorine.

are:

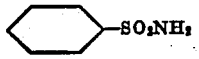

Benzene sulfonamide

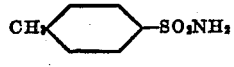

p-Toluene sulfonamide

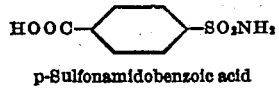

p-Sulfonamidobenzoic acid

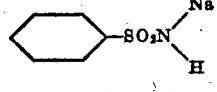

Benzene N-sodium sulfonamide

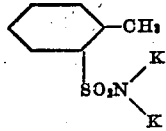

o-Toluene N,N-dipotassium sulfonamide

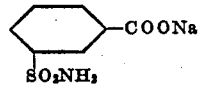

Sodium m-sulfonamidobenzoate

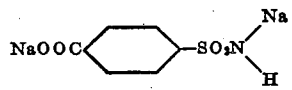

Sodium p-(N-sodium) sulfonamidobenzoate

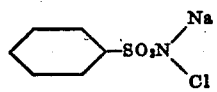

Benzene N-sodium, N-chlorsulfonamide

Sodium p-(N-sodium, N-chlor) sulfonamidobenzoate

The most effective stabilizing agent, on the basis of weight, is benzene N-sodium sulfonamide. When one equivalent of this compound (179 grams) is dissolved in a given amount of sodium hypochlorite solution, the first equivalent of acid arising, for example, by contamination with carbon dioxide absorbed from the atmosphere, will liberate the free base, benzene sulfonamide

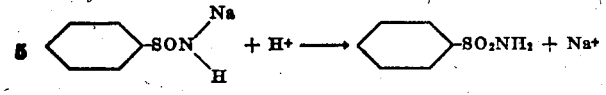

This compound immediately reacts with the alkali-metal hypochlorite solution (e. g., NaOCl) to form the stable, soluble benzene N-sodium, N-chlorsulfonamide.

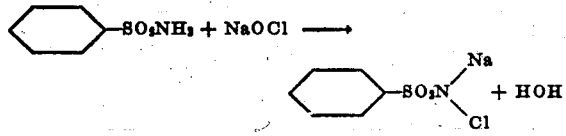

The next two equivalents of acid added (or absorbed) will cause the following reaction to occur:

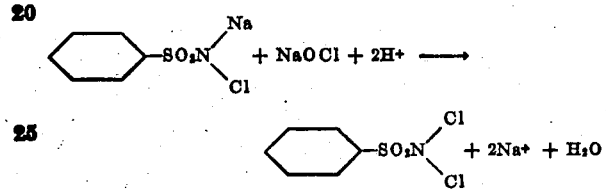

Thus, instead of forming free hypochlorous acid, there is formed instead the insoluble benzene N,N-dichlorsulfonamide. The presence of the benzene sulfonamide, the N-sodium derivative or the N-sodium, N-chlor derivative thereof effectively prevents the formation of free hypochlorous acid. Instead, an insoluble, highly stable positive chlorine-containing sulfonamide is formed. By thus removing HOCl from the field of reaction continuously and immediately upon formation, the deep-seated decomposition normally resulting from its presence is obviated.

Since benzene N-sodium sulfonamide will effectively buffer three equivalents of acid, and benzene sulfonamide and benzene N-sodium, N-chlorsulfonamide will each buffer two equivalents of acid, any of these compounds may conveniently be added to the original solution as a stabilizing agent, but the former is preferred. The other aryl sulfonamides and their corresponding N-alkali metal and N-chlor, N-alkali metal derivatives are similarly effective in an analogous quantitative manner.

An unexpected and unforeseen advantage results from the use of these compounds as stabilizing agents for hypochlorite solutions. When exposed to carbon dioxide, or progressively acidified, at or near the equivalence point a "skin" or film of aryl-N,N-dichlorsulfonamide forms on the surface of the solution and effectively excludes and inhibits the further absorption of carbon dioxide. This "skin" or film may be broken, but reforms on continued exposure to carbon dioxide. This mode of protecting the hypochlorite solution is novel and provides an additional buffering action of a physical rather than chemical nature.

When compounds of the general formula

are used as stabilizing agents, this film formation does not result. However, the resultant solutions remain completely clear and do not show any precipitation until the pH has been lowered below 5.0 and the hypochlorite has been completely decomposed. Such solutions are desirable when the stabilized hypochlorite solutions of the present invention are to be used in acid media to effect a gradual liberation of active chlorine. Thus, wool may be rendered creaseproof and wrinkleproof by immersion for 20 to 30 minutes at room temperature in a solution containing 5.0% of stabilized sodium hypochlorite solution and 5.0% of 80% formic acid. The wool is then freed of active chlorine by immersion in a 1% solution of 35° Bé. NaHSO₃ solution. For such applications, the presence of a film- or precipitate-forming stabilizing agent in the hypochlorite solution is, of course, undesirable.

The preferred stabilizing agent of the general formula

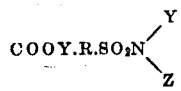

is sodium p-(N-sodium) sulfonamidobenzoate or its meta isomer. These compounds will buffer three equivalents of acid to form the stable, water-soluble sodium p-N,N-dichlorsulfonamidobenzoate (or the corresponding meta isomer). If the free sulfonamidobenzoic acids are used, the following reactions occur:

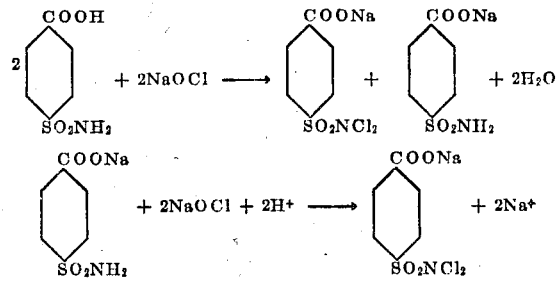

The overall result is that the sodium (N-sodium) sulfonamidobenzoate can react with three equivalents of acid, the sodium sulfonamidobenzoates—with two equivalents and the free sulfonamidobenzoic acids—with one equivalent of acid. In each case, there is obtained the water-soluble sodium N,N-dichlorsulfonamidobenzoate instead of the insoluble aryl N,N-dichlorsulfonamide.

The use of the stabilizing agents of the present invention also increases the germicidal activity of the hypochlorite solutions to which they are added. Thus, benzene N-sodium, N-chlorsulfonamide, also known as Chloramine B, has a phenol coefficient of 100 against *Eb. typhosa*, 20 against *Staph. aureus* and 30 against *Trichophyton rosaceum*. Similarly, p-toluene-N-sodium, N-chlorsulfonamide, also known as Chloramine T (Dakin, British Medical Journ., Jan. 29, 1916; Proc. Roy. Soc. B., 89, 232 (1916)) and sodium p-N,N-dichlorsulfonamidobenzoate, also known as Halazone (Dakin and Dunham, British Medical Journal, May 26, 1917, 682–684) are highly effective germicides.

The stabilizing agents of the present invention may be used in amounts varying from 0.001% to 1.0% of the weight of the hpyochlorite solution. The preferred range is between 0.1% and 0.5%. However, these concentrations are by no means critical. It is obvious that higher concentrations provide more buffering and stabilizing action, but increase the cost of the product. The suitable concentration of the stabilizing agent can be determined on the basis of the ultimate use, duration of shelf storage, hypochlorite concentration and selling price of the finished product. It may lie within the indicated range of concentrations, or may be greater or less than the limits of said indicated range.

The stabilizing agents may be incorporated into the hypochlorite solutions in any suitable manner. Thus:

(a) the aryl N-alkali-metal sulfonamide may be dissolved in the hypochlorite solution, or (b) the aryl sulfonamide may be dissolved in caustic alkali solution of the requisite concentration, which is then chlorinated until one mole of chlorine has been absorbed for every two moles of caustic soda, or (c) a caustic alkali solution of the requisite concentration may be chlorinated in the usual manner, leaving a small excess of free caustic alkali. The stabilizing agent is then dissolved in the solution, reacting with the free caustic alkali to form the aryl N-sodium sulfonamide.

The reaction of the freshly prepared stabilized hypochlorite solutions of the present invention lies between pH 10.0 and 13.0, but may diminish on standing without causing the solution to decompose. Additional or ancillary agents, such as sodium silicate, sodium phosphate, et cetera, may be added to these solutions without interfering with the stabilizing action. These solutions may be totally devoid of free caustic alkali, or may contain small quantities thereof, depending on the permissible tolerance of the end use of the solution.

Electrolytically prepared solutions of sodium hypochlorite may conveniently be stabilized by the agents herein described. However, in order to prepare relatively concentrated solutions of NaOCl, the well-known procedure of chlorinating a caustic soda solution with efficient cooling to keep the temperature below 20° C., must be used. One of the most important conditions to be observed during this chlorination is the stoichometric relationship. If insufficient chlorine is added, the resultant solution will be excessively alkaline. If too much chlorine is added, free hypochlorous acid is formed by the reaction:

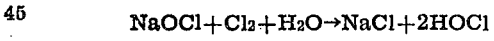

and an extensive decomposition of the solution commences.

If the aryl sulfonamide is dissolved in the caustic alkali solution prior to chlorination, the exact stoichometric end-point is indicated by the first appearance of a film or precipitate of aryl N,N-dichlorsulfonamide. Since it is desired to stop the chlorination at the point corresponding to the presence of aryl N-alkali-metal sulfonamide in the solution, the chlorination should be interrupted short of the appearance of the film of aryl N,N-dichlorsulfamate. Test portions of the reaction mixture are withdrawn periodically and titrated with standard acetic acid solution until the end-point is indicated by the appearance of the film. The proper point to discontinue the chlorination can thus be readily determined.

The following examples are intended to illustrate the present invention but in no ways to limit it to reagents, proportions or conditions described therein. Obvious modifications and improvements will occur to any person skilled in the art.

*Example I*

A solution containing 5.25% of sodium hypochlorite and 6.67% of sodium chloride, devoid of free caustic soda, is stabilized by the addition of 5.0 grams per liter of sodium p-(N-sodium) sulfonamidobenzoate.

Example II

Two hundred and fifty grams of benzene sulfonamide is dissolved in 90.0 liters of caustic soda solution containing 126.0 grams NaOH per liter. In the course of 1.5 hours, 10.0 kgs. of chlorine gas is absorbed in this solution, the temperature being kept below 20° C. by efficient cooling. There is thus obtained about 98.0 liters of a stabilized sodium hypochlorite solution containing 100 grams of active chlorine per liter.

Example III

Chlorine gas is passed through 90.0 liters of a caustic soda solution containing 131.0 grams of NaOH per liter, with efficient cooling to keep the temperature below 20° C., until 10.0 kgs. of chlorine has been absorbed. One hundred grams of p-toluene sulfonamide is now added and the reaction mixture is stirred until the stabilizing agent has dissolved completely. The reaction of the resultant solution is then adjusted to pH 12.5 by the gradual addition of glacial acetic acid. There is thus obtained about 98.0 liters of a stabilized sodium hypochlorite solution containing 10% of active chlorine.

The stabilized alkali-metal hypochlorite solutions of the present invention are suitable for use in the household, in laundries, dairies, textile mills, hospitals, swimming pools, plants, public institutions, et cetera, for cleaning, bleaching, deodorizing, disinfecting, for removing stains, scorch and mildew, as a germicidal rinse, for bottle sterilization, for desizing textiles, oxidizing vat dyes, clearing cotton prints, skrinkproofing wool, as a kier boiling assistant and for a host of other uses wherever an oxidizing and/or chlorinating agent may be employed.

Having described my invention, what I claim and desire to protect by Letters Patent is:

1. A process for the stabilization of aqueous alkali metal hypochlorite solutions which comprises adding thereto from 0.001% to 1.0% of a member of the group of compounds of the general formula

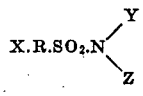

where R is an aryl group, X is a member of the group consisting of hydrogen and —COOY groups, Y is a member of the group consisting of hydrogen and alkali-metal atoms and Z is a member of the group consisting of hydrogen, alkali-metal and chlorine atoms.

2. The process of claim 1, in which the added material is benzene sulfonamide.

3. The process of claim 1, in which the added material is p-toluene sulfonamide.

4. The process of claim 1, in which the added material is benzene N-sodium sulfonamide.

5. A stabilized aqueous hypochlorite solution, containing a soluble hypochlorite and as a stabilizing agent a minor amount of a member of the group of compounds of the general formula

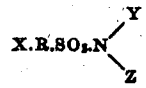

where R is an aryl group, X is a member of the group consisting of hydrogen and —COOY groups, Y is a member of the group consisting of hydrogen and alkali-metal atoms, and Z is a member of the group consisting of hydrogen, alkali-metal and chlorine atoms, said stabilizing agent being present in an amount in the range 0.001% to 1%.

6. A stabilized aqueous hypochlorite solution as defined in claim 5, in which the stabilizing agent is benzene sulfonamide.

7. A stabilized aqueous hypochlorite solution as defined in claim 5, in which the stabilizing agent is p-toluene sulfonamide.

8. A stabilized aqueous hypochlorite solution as defined in claim 5, in which the stabilizing agent is benzene N-sodium sulfonamide.

JONAS KAMLET.

REFERENCES CITED

The following references are of record in the file of this patent:

UNITED STATES PATENTS

| Number | Name | Date |
| --- | --- | --- |
| 1,650,124 | Gunzler, et al. | Nov. 22, 1927 |
| 1,676,309 | Wright | July 20, 1927 |
| 1,890,603 | Feibelmann | Dec. 13, 1932 |
| 1,894,539 | Mirau | Jan. 17, 1933 |
| 2,263,948 | Halvorson, et al. | Nov. 25, 1941 |

FOREIGN PATENTS

| Number | Country | Date |
| --- | --- | --- |
| 360,183 | Great Britain | Nov. 5, 1931 |

Certificate of Correction

Patent No. 2,438,781.   March 30, 1948.

JONAS KAMLET

It is hereby certified that error appears in the printed specification of the above numbered patent requiring correction as follows: Column 3, line 20, after the syllable and period "rine." insert the following words, beginning a new paragraph: *Typical members of this group of compounds*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*